United States Patent
Foiret

(10) Patent No.: US 10,024,240 B2
(45) Date of Patent: Jul. 17, 2018

(54) METHOD FOR DETERMINING A DURATION OF MOVEMENT FOR A STARTER AIR VALVE OF A TURBINE ENGINE

(71) Applicant: SNECMA, Paris (FR)

(72) Inventor: Guilhem Alcide Auguste Foiret, Paris (FR)

(73) Assignee: SNECMA, Paris (FR)

(*) Notice: Subject to any disclaimer, the term of this patent is extended or adjusted under 35 U.S.C. 154(b) by 368 days.

(21) Appl. No.: 14/751,953

(22) Filed: Jun. 26, 2015

(65) Prior Publication Data
US 2015/0377141 A1    Dec. 31, 2015

(30) Foreign Application Priority Data
Jun. 26, 2014  (FR) ...................... 14 55962

(51) Int. Cl.
| F02C 7/268 | (2006.01) |
| F02C 7/27  | (2006.01) |
| F01D 19/00 | (2006.01) |
| F02C 9/16  | (2006.01) |
| F02C 9/18  | (2006.01) |
| F02C 7/057 | (2006.01) |

(52) U.S. Cl.
CPC .............. *F02C 7/27* (2013.01); *F01D 19/00* (2013.01); *F02C 7/057* (2013.01); *F02C 9/16* (2013.01); *F02C 9/18* (2013.01); *F05D 2220/30* (2013.01); *F05D 2260/85* (2013.01); *F05D 2270/301* (2013.01)

(58) Field of Classification Search
CPC .. F01D 19/00; F02C 7/057; F02C 7/27; F02C 9/16; F02C 9/18; F05D 2220/30; F05D 2260/85; F05D 2270/301
See application file for complete search history.

(56) References Cited

U.S. PATENT DOCUMENTS

| 4,765,131 A | 8/1988 | Benson |
| 5,463,865 A * | 11/1995 | Smith ................... F02C 7/277 |
| | | 415/118 |

(Continued)

FOREIGN PATENT DOCUMENTS

| EP | 0 786 589 A1 | 7/1997 |
| EP | 1 772 608 A1 | 4/2007 |

OTHER PUBLICATIONS

Search Report as issued in French Patent Application No. 1455962, dated Mar. 10, 2015.

*Primary Examiner* — Jesse Bogue
(74) *Attorney, Agent, or Firm* — Pillsbury Winthrop Shaw Pittman LLP

(57) ABSTRACT

A method of determining a duration of a movement of a starter air valve of a turbine engine, the valve for regulating the passage of a flow of pressurized air from upstream to the downstream of pipework, where the downstream side is connected to a pneumatic starter of the turbine engine, the method including determining an instant of initiation and an instant of completion of a movement of the valve during a movement phase of the valve, determining the duration of the movement of the valve, by subtracting the instant of initiation from the instant of completion, calculating a difference between the determined duration of the movement and a theoretical value of the duration.

12 Claims, 4 Drawing Sheets

(56) References Cited

U.S. PATENT DOCUMENTS

| | | | | |
|---|---|---|---|---|
| 5,748,500 | A * | 5/1998 | Quentin | G07C 3/00 702/182 |
| 5,867,986 | A * | 2/1999 | Buratti | F02B 37/24 60/602 |
| 6,351,090 | B1 * | 2/2002 | Boyer | F02C 7/275 290/10 |
| 6,456,928 | B1 * | 9/2002 | Johnson | F02B 77/08 701/111 |
| 7,147,430 | B2 * | 12/2006 | Wiggins | F01D 17/145 137/488 |
| 2006/0173607 | A1 * | 8/2006 | Matsuo | G01F 1/34 701/114 |
| 2006/0174628 | A1 | 8/2006 | Mikhail | |
| 2013/0204468 | A1 * | 8/2013 | Camhi | G06F 17/00 701/3 |
| 2014/0020396 | A1 * | 1/2014 | Corpron | B64D 31/00 60/772 |
| 2014/0352658 | A1 * | 12/2014 | Jackson | G01L 27/007 123/344 |
| 2014/0373554 | A1 * | 12/2014 | Pech | F02C 7/277 60/788 |
| 2015/0192499 | A1 * | 7/2015 | Piol | G05B 23/0254 73/112.01 |

* cited by examiner

METHOD FOR DETERMINING A DURATION OF MOVEMENT FOR A STARTER AIR VALVE OF A TURBINE ENGINE

CROSS-REFERENCE TO RELATED APPLICATIONS

This application claims priority to French Patent Application No. 1455962, filed Jun. 26, 2014, the entire content of which is incorporated herein by reference in its entirety.

FIELD

The invention relates to the general field of starter air valves of turbine engines. It relates more specifically to methods for determining the characteristics of the openings or closures of the valves.

BACKGROUND

To start a turbine engine a starter is used which supplies a drive torque to the shaft of the turbine engine. The purpose of such a drive torque is to overcome all the resistive torques exerted by the shaft and which are primarily the result of the aerodynamic drag of the parts which are made to rotate, of the mechanical friction of parts in contact and viscous frictional losses between the parts in contact immersed in the fluid of at least one hydraulic lubrication and/or thermal regulation circuit associated with the turbine engine. The starter gradually accelerates the turbine engine, and when a pre-defined speed of rotation is reached injection and ignition of the fuel in the combustion chamber of the turbine engine are initiated. Then, at another pre-defined speed of rotation, the action of the starter is stopped and the turbine engine continues to accelerate up to its idling speed due to the combustion of the fuel.

Known starters are of the pneumatic type (a turbine fed by compressed air) or of the electric type. Only pneumatic starters are considered in the context of the invention. FIG. 1 shows a pneumatic starter 10 on a fan 11 of a turbine engine of an aircraft. The pneumatic starter 10 is designed to be supplied with compressed air via pipework 12. Generally the air upstream 13 of the pipework 12 is pressurised by means of an auxiliary power unit (APU) located in the aircraft. Sometimes the air is pressurised by a unit on the ground or by air taken from another turbine engine which has already started up. Regardless of the source of the compressed air, air under pressure reaches the upstream side 13 of the pipework as arrow 14 shows, bound for the pneumatic starter 10.

A starter air valve 15 (SAV) regulates the flow of pressurised air in the pipework 12: the valve 15, by opening or closing, is capable of allowing, preventing or limiting the routing of compressed air towards the downstream side 16 of the pipework 12 where the pneumatic starter 10 is located. When closed the starter air valve 15 prevents the pressurised air from reaching the pneumatic starter 10. When the turbine engine starts up, the starter air valve 15 gradually opens, allowing compressed air to pass onto the pneumatic starter 10. The pressurised air then enters the turbine of the starter 10, which transforms the pneumatic energy into mechanical energy to make the shaft of the turbine engine rotate. It should be noted that the airflow reaching the starter 10 is directly linked to the degree of opening of the starter air valve 15.

A significant proportion of unsuccessful start-ups have jamming of the opening or closure of the starter air valve as their source. When jammed closed, the pneumatic starter is never exposed to the pressurised air and the shaft is not made to rotate. When jammed open, it can cause the pneumatic starter to run at excessive speed. Once uncoupled from the shaft the pneumatic starter is not exposed to a resistive torque, but continues to be supplied with compressed air.

Most pneumatic start turbine engines use a butterfly-type starter air valve. In practice a proximity sensor is commonly used to establish the precise moment at which the butterfly completes an opening movement or a closure movement. Depending on its position, the proximity sensor indicates when the valve is fully closed or when the valve is fully opened. It should be noted that such a proximity sensor can be used to tell if the valve is open or if the valve is shut, but is not capable of providing these two items of information for the same valve. Two proximity sensors would be required in order to know when the valve is open and when the valve is closed. Some starter air valves however are not fitted with such sensors, or there may in fact be a fault in the sensor.

SUMMARY

It is desirable to offer an alternative solution to the proximity sensor, one allowing a malfunction of the valve to be detected.

To this end, according to a first aspect of the invention, there is provided a method for determining a duration of a movement of a starter air valve for a turbine engine, the valve being suitable for regulating the passage of a flow of pressurised air from upstream to the downstream of a pipework, where the downstream side of the pipework is connected to a pneumatic starter of the turbine engine, the method comprising:

Determining an instant of initiation and an instant of completion of a movement of the valve during a movement phase of the valve,
Determining the duration of the movement of the valve, by subtracting the instant of initiation from the instant of completion.
Calculating a difference between the determined duration of the movement and a theoretical value of the duration, wherein the instant of initiation and the instant of the completion are each determined by a method which comprises:
Periodically measuring a pressure within the upstream side of the pipework, during a valve movement phase,
Obtaining a characteristic quantity of the change of pressure as a function of time,
Determining a representative instant at which the characteristic quantity exhibits a variation representative of an initiation or a completion of a movement of the valve,
Determining the instant of initiation or the instant of completion as being the representative instant.

It should be noted that the pipework may be made in one piece or of several assembled parts, without this changing the principle of the invention.

The expression continuous measurement means a measurement made at an acquisition frequency which is sufficiently great to show the variations in pressure.

The term movement means opening or closure the starter air valve.

Pressure measurements are made periodically at a sufficient frequency to allow precise monitoring of the pressure variations. This frequency is, for example, the frequency of the computer of the turbine engine.

The duration of the opening or closure of the valve is used as an indicator to monitor the state of deterioration or malfunctions of the valve. In effect, a slower opening or closure than normal may be caused for example by excessive friction of the valve butterfly, wear to the valve diagram, contamination of the valve by foreign matter such as sand, frost etc. A comparison of the duration of movement determined by the method with the nominal movement duration indicated by the manufacturer (theoretical value) allows deterioration or malfunction of the valve to be detected. Comparing the change in the duration of movement over time also allows changes in the deterioration or malfunction to be determined.

In a first non-restrictive embodiment, the characteristic quantity of the change in pressure as a function of time is the derivative of the change in pressure, and the representative instant at which the derivative exhibits a representative variation of an initiation or of a completion of a movement of the valve is determined as an instant at which this derivative passes from a null value to a non-null value, or vice versa.

In a second non-restrictive embodiment, the characteristic quantity of the change in pressure as a function of time is a series of linear regression lines calculated over successive intervals of measured values of the pressure.

In a second embodiment, from recorded periodic measurements of the pressure:
 a median time interval is identified during which the difference between two successive measurement of the pressure exceeds, as an absolute value, a predetermined threshold,
 a first linear regression line is calculated over this median time interval,
 a second and third linear regression lines are calculated over time intervals which respectively precede and follow the median time interval, and
 the instant of initiation and the instant of completion of the movement of the valve are calculated as being, respectively, the point of intersection between the first and second linear regression lines and the point of intersection between the second and third linear regression lines.

Besides the characteristics which have just been stated in the preceding paragraphs, the method of determining a duration of a movement of a starter air valve according to an embodiment of the invention may exhibit one or more additional characteristics from amongst the following, considered individually or according to technically possible combinations.

In an embodiment, the method for determining a duration of a movement comprises the following step: triggering a first alarm when the difference between the determined duration of the movement and the theoretical value of the duration is greater than a duration threshold.

In effect, the deteriorations that it is sought to detect are gradual. The duration the movement is therefore determined regularly, and changes in it are monitored. An alert is raised when this duration of movement extends beyond a critical duration threshold. This alerts maintenance personnel before a fault occurs.

In an embodiment, the method of determination of a movement duration includes the following steps:
 Determining the pressure difference within the upstream side of the pipework, between the instant of initiation and the instant of completion.
 Comparing the pressure difference against an expected value.

In effect, in normal operation the loss of pressure associated with the opening or closure of the starter air valve is supposed to be constant. A loss of pressure less than the expected value may therefore be a sign that the valve is jammed in a partially open position. It should be noted, however, that the stabilised pressures (before and after opening of the starter air valve) within the pipework may vary according to context parameters, in particular the meteorological conditions or the state of the turbine engine (temperature, pressure, condition of the source of compressed air etc.). It is appropriate therefore to use a behavioural model which is a function of the context parameters to provide the expected value.

In an embodiment, the method for determining a duration of a movement comprises the following step: triggering a second alarm when the difference between the pressure difference and the expected value is greater than a pressure threshold.

According to a second aspect of the invention, there is provided a method for determining an instant of completion of a movement of a starter air valve for a turbine engine, the valve being suitable for regulating the passage of a flow of pressurised air from upstream to the downstream of a pipework, where the downstream side of the pipework is connected to a pneumatic starter of the turbine engine, the method comprising:
 Periodically measuring a pressure within the upstream side of the pipework, during a valve movement phase
 Deriving the change of pressure as a function of time
 Determining the instant at which the derivative passes from a non-null value to a null value, this instant corresponding to the instant of completion of the valve movement.

When the movement is an opening, the instant of completion of the opening of the valve corresponds to the instant at which the derivative passes from a negative value to a null value. When the movement is a closure, the instant of initiation of the closure of the valve corresponds to the instant at which the derivative passes from a positive value to a null value.

It should be noted that when the valve is equipped with a proximity sensor, its measurements may be confirmed and it is thus possible to determine when the sensor is faulty.

In an embodiment, the method for determination of an instant of completion of a movement of a starter air valve comprises the following step, between the derivation step and the determination step: filtering the derivative. In certain configurations, the measured pressure is not completely stable (for example if the acquisition frequency of the pressure is high); its derivative is therefore more difficult to use. Filtering the derivative can therefore improve detection.

According to a third aspect of the invention, there is provided a method for determining an instant of initiation of a movement of a starter air valve for a turbine engine, the valve being suitable for regulating the passage of a flow of pressurised air from upstream to the downstream of a pipework, where the downstream side of the pipework is connected to a pneumatic starter of the turbine engine, the method comprising:
 Periodically measuring a pressure within the upstream side of the pipework, during a valve movement phase,
 Deriving the change of pressure as a function of time, Determining the instant at which the derivative passes from a null value to a non-null value, this instant corresponding to the instant of initiation of the valve movement.

When the movement is an opening, the instant of initiation of the opening of the valve corresponds to the instant at which the derivative passes from a null value to a negative value. When the movement is a closure, the instant of initiation of the closure of the valve corresponds to the instant at which the derivative passes from a null value to a positive value.

In an embodiment, the method for determination of an instant of initiation of a movement of a starter air valve comprises the following step, between the derivation step and the determination step: filtering the derivative. In certain configurations, the measured pressure is not completely stable (for example when the acquisition frequency of the pressure is high); its derivative is therefore more difficult to use. Filtering the derivative can therefore improve detection.

According to a fourth aspect of the invention, there is provided a method for determining a duration of a movement of a starter air valve for a turbine engine, the valve being suitable for regulating the passage of a flow of pressurised air from upstream to the downstream of a pipework, where the downstream side of the pipework is connected to a pneumatic starter of the turbine engine, the method comprising:
  Determining an instant of initiation of a movement of the valve during a movement phase of the valve, by implementing a method for determining an instant of initiation according to the third aspect
  Determining an instant of completion of a movement of the valve during the movement phase of the valve, by implementing a method for determining an instant of completion according to the second aspect
  Determining the duration of the movement of the valve, by subtracting the instant of initiation from the instant of completion
  Comparing the determined duration of the movement to a theoretical value of the duration.

According to a fifth aspect of the invention, there is provided a computer program comprising a set of instructions which, when they are executed by a turbine engine computer, causes the implementation of a method according to the first aspect, the second aspect, the third aspect or the fourth aspect of the invention.

The invention and its various applications will be better understood on reading the following description and on examination of the figures which accompany it.

BRIEF DESCRIPTION OF THE FIGURES

The figures are only given for indication purposes and are in no way intended to limit the invention. The figures show.

DETAILED DESCRIPTION

Figure 1:
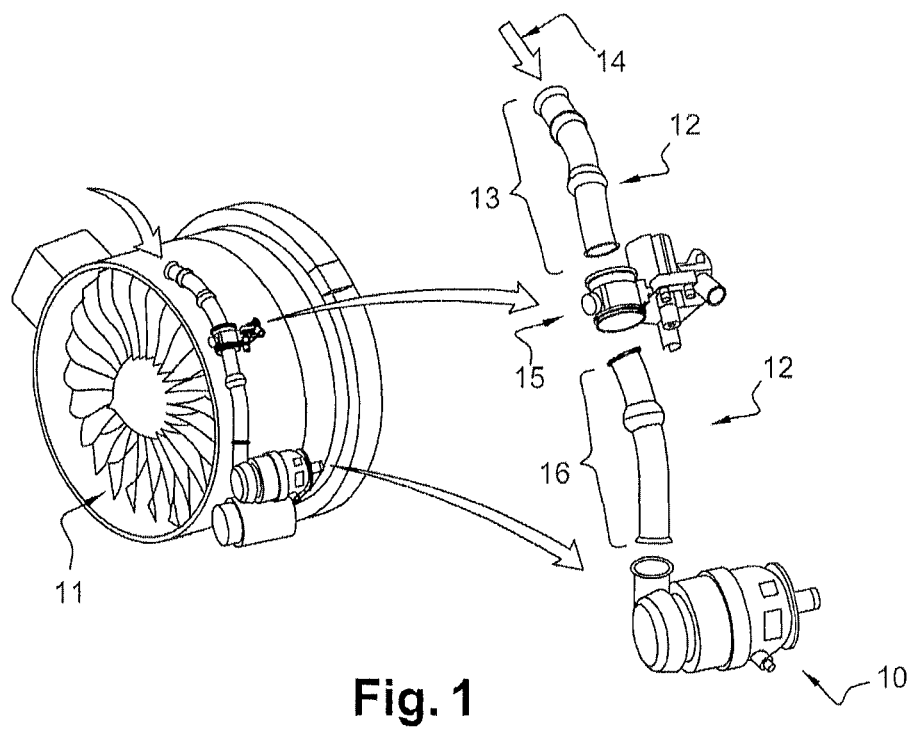
In FIG. 1, already described, a schematic representation of a pneumatic starter comprising a starter air valve.

As explained previously and with reference to FIG. 1, the methods according to embodiments of the invention provide indications about a movement (opening or closure) of a starter air valve 15 of a pneumatic starter 10 of a turbine engine. The starter air valve 15 is placed on pipework 12 used to lead the compressed air from a source of compressed air towards the pneumatic starter 10. The air flow received by the starter 10 (placed on the downstream side 16 of the pipework 12) is directly linked to the degree of opening of the starter air valve 15. A graph showing the percentage of the airflow received by the starter 10 as a function of the degree of opening of a valve 15 of the butterfly type is given in FIG. 2.

Figure 2:
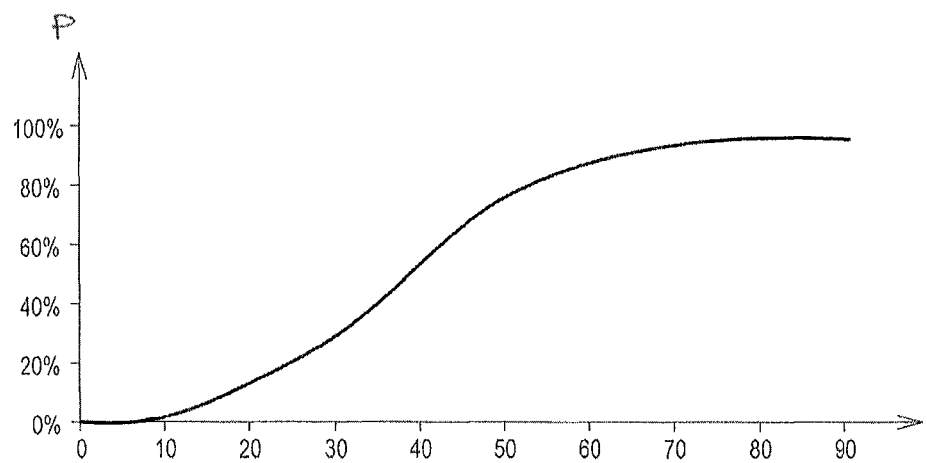
In FIG. 2, a graph showing the percentage of air flow received by the starter as a function of the degree of opening of the starter air valve.

As FIG. 2 shows, for a source of compressed air not regulating at a constant pressure, the opening of the starter air valve 15 (closed beforehand) progressively allows a flow of air to pass through. This results in a reduction in the pressure P within the pipework 12 upstream of the valve 15. Without any other air being taken from the circuit which leads the compressed air to the pneumatic starter 10, the fall in pressure P within the upstream side 13 of the pipework 12 is therefore an indicator of the opening of the valve 15. It is besides part of procedure for the crew to check that this pressure drop has in fact taken place during the start-up of the turbine engine.

The instant of initiation t_AmO of the movement of opening of the valve 15 corresponds to the instant of initiation of the fall in pressure P on the upstream side 13 of the pipework 12 (that is upstream of the starter air valve 15). Furthermore, the instant of completion t_AchO of the opening movement of the valve 15 corresponds to the instant at which the pressure P stabilises on the upstream side of the pipework 12.

Conversely, closure of the starter air valve 15 (open beforehand) gradually reduces the airflow received by the starter 10. This results in an increase in the pressure P within the pipework 12 downstream of the valve 15. Without any other air being taken from the circuit which leads the compressed air to the pneumatic starter 10, the increase in pressure P within the upstream side 13 of the pipework 12 is therefore an indicator of the closure of the valve 15.

The instant of initiation tAm_F of the closure movement of the valve 15 corresponds to the instant of initiation of the increase in pressure P on the upstream side 13 of the pipework 12. Furthermore, the instant of completion tAch_F of the closure movement of the valve 15 corresponds to the instant at which the pressure P stabilises on the upstream side 13 of the pipework 12.

A first way (corresponding to a first embodiment) of determining the instants of initiation tAm_O, tAm_F and of completion tAch_O, tAch_F of a movement (opening or closure) of the valve 15 is achieved by using the derivative of the pressure P (the derivative being if necessary filtered) of the upstream 13 of the pipework 12. In effect, before the instant of initiation tAm_O, tAm_F of an opening or a closure, the pressure P upstream 13 of the pipework 12 is stable, the derivative P' is therefore null. Following the instant of initiation tAm_O, tAm_F, the pressure P falls (in the case of opening) or rises (in the case of closure): the derivative P' therefore becomes negative (in the case of opening) or positive (in the case of closure). Finally following the instant of completion tAch_O, tAch_F, that is when the valve 15 is in its final position, the pressure P stabilises: the derivative P' is therefore null.

Figure 3A:
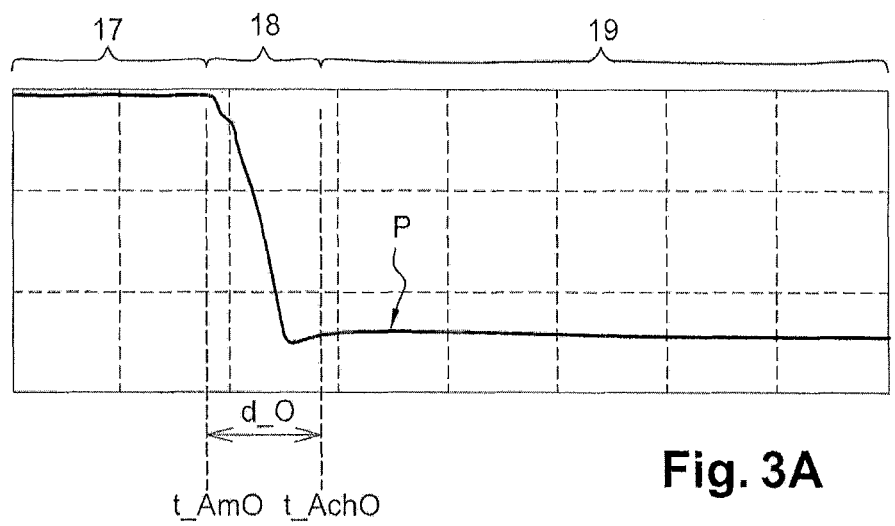
In FIG. 3A, a graph showing the pressure upstream of the starter air valve as a function of time during an opening of the valve.
Figure 3B:
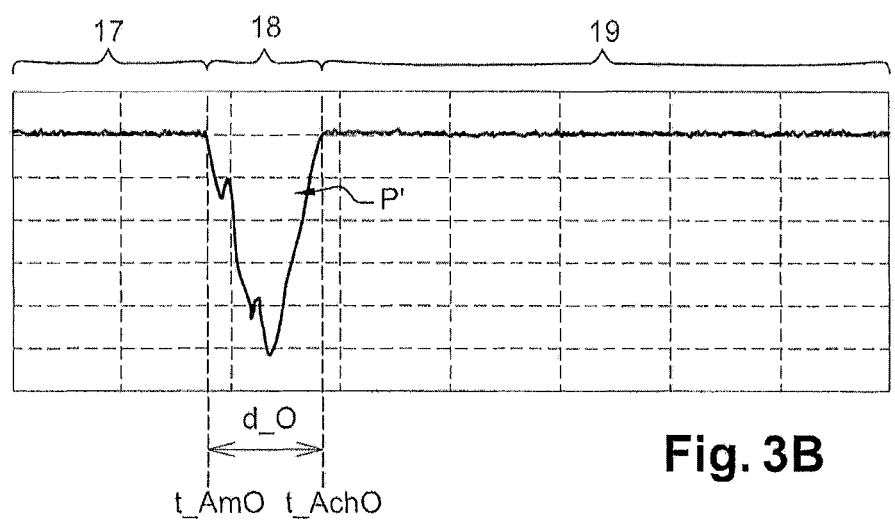
In FIG. 3B, a graph showing the derivative of the graph in FIG. 3A.

FIG. 3A shows a representative graph of the pressure P on the upstream 13 side of the pipework 12 as a function of time, during an opening of the valve 15. The graph shows three successive phases: in a first phase 17 the pressure P is stable; in a second phase 18, the pressure P decreases, in a third phase 19 the pressure P is once again stable. The second phase 18 corresponds to the opening of the valve 15. FIG. 3B shows a representative graph of the derivative P' (filtered) of the curve in FIG. 3A. It can be seen that during the first phase 17, the derivative P' is null; during the second phase 18, the derivative P' is negative; and during the third phase 19, the derivative P' is once more null.

As explained earlier, the instant of passage between the first phase 17 and the second phase 18 corresponds to the instant of initiation tAm_O of the opening of the valve 15. Furthermore, the instant of passage between the second phase 18 and the third phase 19 corresponds to the instant of completion tAch_O of the opening of the valve 15. Determining these instants of initiation tAm_O and of completion tAch_O of the opening of the valve 15 also allow the duration d_O of opening of the valve 15 to be deduced.

The same principles apply to the closure of the valve 15. A graph representing the pressure P on the upstream side of the pipework 12 as a function of time, during a closure of the valve 15, would show three successive phases: in a first phase the pressure P is stable; in a second phase the pressure P increases, in a third phase the pressure P is stable once more. The second phase corresponds to the closure of the valve 15. Similarly a graph representing the filtered derivative P' of this graph would show that during the first phase the derivative P' is null; during the second phase the derivative P' is positive; and during the third phase the derivative P' is null once more.

The instant of passage between the first and second phase corresponds to the instant of initiation tAm_F of the closure of the valve 15. Furthermore, the instant of passage between the second and the third phase corresponds to the instant of completion tAch_F of the closure of the valve 15. Determining these instants of initiation tAm_F and of completion tAch_F of the closure of the valve 15 also allows the duration d_F of closure of the valve 15 to be deduced.

Figure 4:
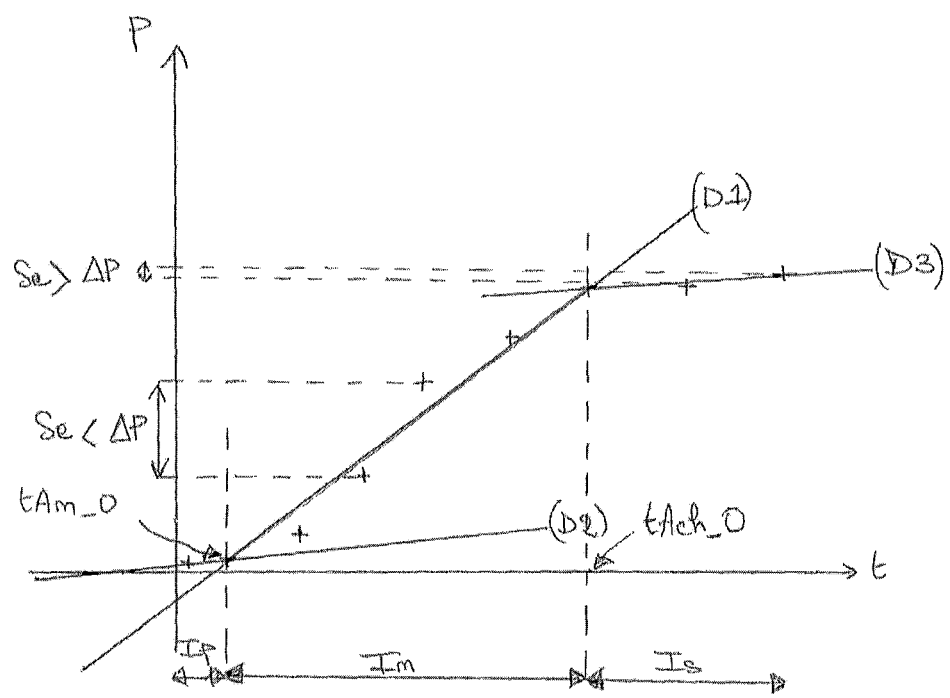
In FIG. 4, a graph showing the pressure measurements upstream of the starter air valve as a function of time during an opening of the valve.

As shown in FIG. 4, a second way (corresponding to a second embodiment) of determining instants of initiation tAm_O, tAm_F and of completion tAch_O, tAch_F of a movement (opening or closure) of the valve 15 involves calculating the linear regression lines D1, D2, D3 from pressure measurements P. This means that it is possible to pre-determine a suitable threshold Se such that:
  before the instant of initiation tAm_O, tAm_F of an opening or of a closure, the pressure difference ΔP between two successive pressure measurements P is less, in absolute terms, than the predetermined threshold Se
  between the instant of initiation tAm_O, tAm_F and the instant of completion tAch_O, tAch_F, the difference ΔP between two measurements of pressure P is greater, in absolute terms, than the predetermined threshold Se, given that the pressure P varies widely over a very short time
  following the instant of initiation tAch_O, tAch_F, the pressure difference ΔP between two successive pressure measurements P is less, in absolute terms, than the predetermined threshold Se.

Thus by identifying a median time interval Im during which the pressure difference ΔP between two successive pressure measurements P exceeds, in absolute terms, the predetermined threshold Se, it is beneficial to:
  calculate a first linear regression line D1 relating to the pressure measurements P over the median time interval Im
  calculate a second linear regression line D2 relating to the pressure measurements P over a time interval Ip which precedes the median time interval Im
  calculate a third linear regression line D3 relating to the pressure measurements P over a time interval Is which follows the median time interval Im The intersection between the first line D1 and the second line D2 corresponds in effect to the instant of initiation tAm_O, tAm_F, whereas the intersection between the first line D1 and the third line D3 corresponds to the instant of initiation tAm_O, tAm_F.

Figure 5:
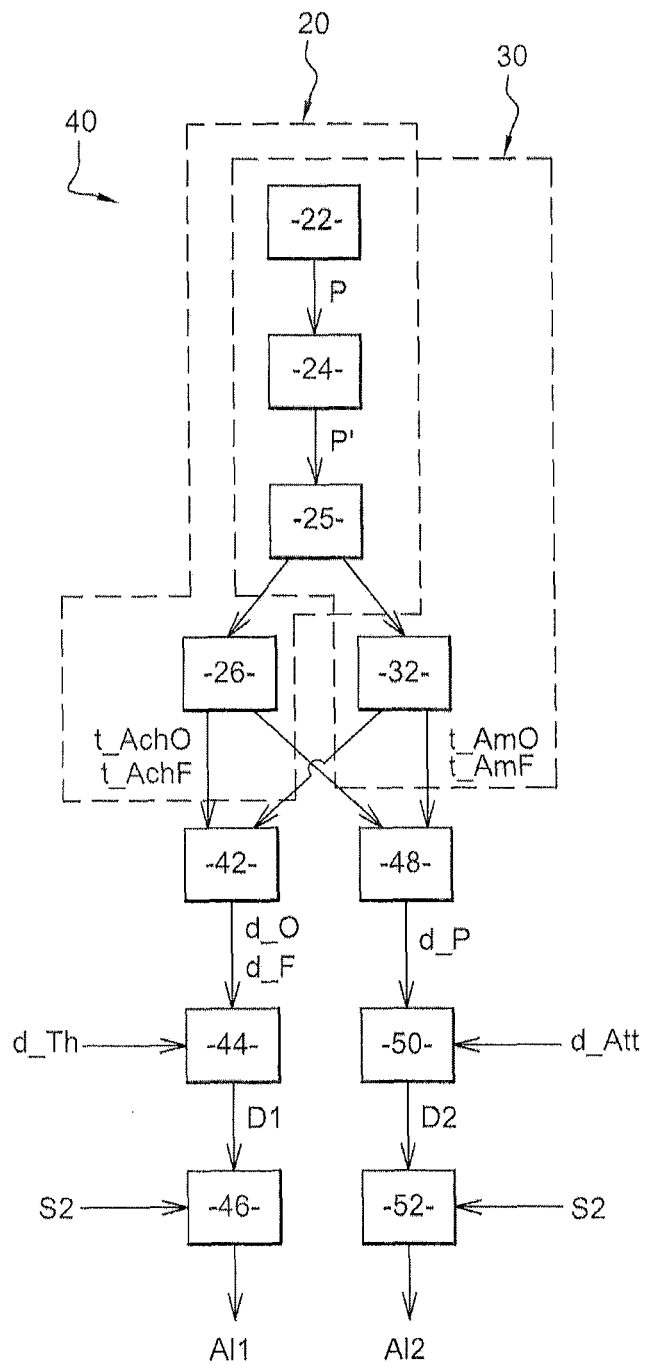
FIG. 5, a schematic representation of the steps in the methods according to an embodiment of the invention.

FIG. 5 shows the steps of three methods:
  a method 20 for determining the instant of completion t_AchO, t_AchF of a movement (opening or closure) of the starter air valve 15 according to the first embodiment presented earlier,
  a method 30 for determining the instant of initiation t_AmO, t_AmF of a movement according to the first embodiment presented earlier, and
  a method 40 for determining a duration of a movement d_O, d_F.

The aforementioned three methods 20, 30, 40 can comprise common steps.

The method 20 for determining the instant of completion t_AchO, t_AchF of the movement (opening or closure) of the starter air valve 15 comprises the following steps:
  Periodically measuring 22 a pressure P within the upstream side 13 of the pipework 12, during a movement phase of the valve 15. The measurement is carried out using a pressure sensor, usually placed at the outlet from the source of compressed air, the latter being generally located in the aircraft tail. Furthermore, the acquisition of all the measurements and all calculations are made by the aircraft's computer which, for example, sends the information via a wireless link to a station on the ground. An algorithm hosted on the ground is responsible for flight-to-flight monitoring of the information. The periodic measurements are, for example, carried out over a period which is equal to that of the computer.
  Obtaining 24 the derivative P' of the change in pressure P as a function of time
  Filtering 25 the derivative P'
  Determining 26 the instant at which the filtered derivative P' passes from a non-null value to a null value, this instant corresponding to the instant of completion tAch_O, t_AchF of the movement of the valve 15.

It should be noted that the filtering step 25 of the derivative P' is not essential; if it is not performed then the instant of completion t_AchO, t_AchF determined during the determination step 26 is the instant at which the derivative P' changes from a non-null value to a null value.

The method 30 for determining the instant of initiation t_AmO, t_AmF of the movement (opening or closure) of the starter air valve 15 comprises the following steps:
  Periodically measuring 22 a pressure P within the upstream side 13 of the pipework 12, during a movement phase of the valve 15.
  Obtaining 24 the derivative P' of the change in pressure P as a function of time
  Filtering 25 the derivative P'

Determining 32 the instant at which the filtered derivative P' changes from a null value to a non-null value, this instant corresponding to the instant of initiation t_AchO, t_AchF of the movement of the valve 15.

It should be noted that the filtering step 25 of the derivative P' is not essential; if it is not performed then the instant of initiation t_AmO, t_AmF determined during the determination step 32 is the instant at which the derivative P' changes from a null value to a non-null value.

Finally, the method 40 of determining the duration d_O, d_F of the movement of a starter air valve 15 of a turbine engine, the valve 15 being suitable for regulating the passage of a flow of pressurised air from upstream 13 to the downstream 16 of pipework 12, where the downstream side 16 of the pipework 12 is connected to a pneumatic starter 10 of the turbine engine, the method 40 comprising the following steps:

Determining 32 an instant of initiation t_AmO, t_AmF of a movement of the valve 15 during a movement phase of the valve 15, by implementing a method for determining the instant of initiation t_AmO, t_AmF of the movement according to the first or the second embodiment presented previously.

Determining 26 an instant of completion t_AchO, t_AchF of the movement of the valve 15 during the movement phase of the valve 15, by implementing the method 20 for determining an instant of completion t_AchO, t_AchF of the movement.

Determining 42 the duration d_O, d_F of the movement of the valve 15, by subtracting the instant of initiation t_AmO, t_AmF from the instant of completion t_AchO, t_AchF Calculating 44 a difference D1 between the determined duration d_O, d_F of the movement and a theoretical value d_Th of the duration. The theoretical value d_Th is, for example, the value indicated by the manufacturer of the valve.

Triggering 46 a first alarm Al1 when the difference D1 between the determined duration d_O, d_F of the movement and a theoretical duration d_Th is greater than a duration threshold S1. In one embodiment:

The standard deviation of a healthy distribution of the duration of movement d_O, d_F of valve 15 is identified. For example, over 100 movements of a healthy valve 15, the mean value of the duration d_O, d_F is 4.5 seconds, with a standard deviation of 0.5 seconds.

The duration threshold S1 is set at three times this standard deviation, that is, 1.5 seconds in the example.

In the example, a first alarm Al1 is therefore raised when the duration d_O, d_F of movement of the valve 15 is greater than 6 seconds.

It should be noted that the deterioration that it is sought to monitor is gradual. Monitoring of the indicator d_O, d_F of movement of the valve 15 is carried out as a trend, that is, its value is monitored from one flight to the next, over numerous flights. The first alarm Al1 is raised when the duration d_O, d_F of movement extends beyond the critical duration threshold S1. This means that an alarm is raised before a fault occurs, allowing maintenance operations to be anticipated.

Determining 48 the pressure difference d_P within the upstream side 13 of the pipework 12, between the instant of initiation t_AmO, t_AmF and the instant of completion t_AchO, t_AchF Calculating 50 a difference D2 between the pressure difference d_P and an expected value d_Att Triggering 52 a second alarm Al2 when the difference D2 between the pressure difference d_P and the expected value d_Att is greater than a pressure threshold S2. In normal operation the pressure difference d_P associated with the opening of the starter air valve 15 is supposed to be constant. A pressure difference d_P less than the previously measured values may therefore be the sign of a valve 15 which is partially jammed open or closed. It is appropriate nevertheless to state that the stabilised pressures P (before and after movement of the valve 15) within the pipework 12 can vary depending on the day to day conditions (temperature, pressure, status of the compressed air source etc.). It is appropriate therefore to use a healthy behavioural model, which is a function of the context parameters, to detect jamming of the valve 15. In an embodiment, a learning phase is used to construct a healthy model of the pressure P as a function of the context (ambient temperature, ambient pressure etc.). The learning phase requires, for example, 300 movements of the valve 15 in order to ensure as representative a context as possible. Then, in normal operation, for each movement (opening or closure) of the valve 15, the model will give the expected pressure value d_Att as a function of the start-up context. It is this expected value d_Att that is compared with the determined value of the pressure difference d_P, and is used to detect when the valve 15 is partially open or closed.

Having described and illustrated the principles of the invention with reference to various embodiments, it will be recognized that the various embodiments can be modified in arrangement and detail without departing from such principles. It should be understood that the devices, modules, processors, processing units, programs, processes, or methods described herein described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

Execution of the sequences of machine instructions contained in the memory causes the processor or processing unit to perform at least some of the process steps, calculations or function(s) of the procedures described herein. One or more physical processors or physical processing units in a multi-processing arrangement may also be employed to execute the sequences of instructions contained in the memory or machine/computer readable medium. In alternative embodiments, hard-wired circuitry may be used in place of or in combination with software instructions.

The term "computer readable medium" or "machine readable medium" as used herein refers to any medium that participates in providing instructions to a processor or processing unit for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer/machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer/machine readable media may be involved in carrying one or more sequences of one or more instructions to processor for execution.

Computer programs comprising machine executable instructions for implementing at least one of the steps of the method described herein or function(s) of various elements of the structural arrangement can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem currently faced by designers for determining the characteristics of the openings or closures of the valves.

The invention claimed is:

1. A method of determining a duration of a movement of a starter air valve of a turbine engine, the starter air valve being configured to regulate the passage of a flow of pressurized air from an upstream side to a downstream side of a pipework, where the downstream side of the pipework is connected to a pneumatic starter of the turbine engine, the method comprising:
    determining an instant of initiation and an instant of completion of a movement of the starter air valve during a movement phase of the starter air valve;
    determining the duration by subtracting the instant of initiation from the instant of completion;
    calculating a difference between the duration and a theoretical value of the duration;
    wherein the instant of initiation and the instant of the completion are each determined by:
        periodically measuring a pressure within the upstream side of the pipework, during the movement phase,
        obtaining a characteristic quantity representing a change in pressure as a function of time, wherein from a recording of periodic measurements of the pressure:
            a median time interval is identified during which a difference between two successive pressure measurements exceeds, in absolute terms, a predetermined threshold,
            a first linear regression line is calculated over the median time interval,
            a second linear regression line and a third linear regression line are calculated over time intervals which respectively precede and follow the median time interval, and
            the instant of initiation and the instant of completion are calculated as being a point of intersection between the first linear regression line and the second linear regression line, and a point of intersection between the second linear regression line and the third linear regression line, respectively,
        determining a representative instant at which the characteristic quantity shows a variation representative of an initiation or of a completion of the movement,
        determining the instant of initiation or the instant of completion as being the representative instant.

2. The method according to claim 1, wherein the characteristic quantity is a derivative of the change in pressure, and the representative instant at which the derivative exhibits the variation representative of the initiation or of the completion of the movement is determined as a corresponding instant at which the derivative changes from one of: a null value to a non-null value, or vice versa.

3. The method according to claim 1, wherein the characteristic quantity is a series of linear regression lines calculated over successive intervals of measured values of the pressure, the series of linear regression lines comprising at least the first linear regression line, the second linear regression line, and the third linear regression line.

4. The method according to claim 1, further comprising:
    triggering a first alarm when the difference is greater than a duration threshold.

5. The method according to claim 1, further comprising:
    determining a pressure difference within the upstream side of the pipework, between the instant of initiation and the instant of completion; and
    calculating a difference between the pressure difference and an expected value.

6. The method according to claim 5, further comprising:
    triggering a first alarm when the difference between the pressure difference and the expected value is greater than a pressure threshold.

7. A computer program comprising a set of instructions which, when executed by a turbine engine's computer, causes the implementation of a method according to claim 1.

8. The method according to claim 1, wherein the pressure is periodically measured using a pressure sensor placed at an outlet of a compressor.

9. The method according to claim 1, wherein the pressure sensor is located in a tail of an aircraft.

10. The method according to claim 1, wherein the characteristic quantity comprises a derivative of the pressure, the method further comprising:
    obtaining a filtered derivative, wherein the representative instant is associated with the filtered derivative.

11. The method according to claim 1, wherein the theoretical value is indicated by a manufacturer of the starter air valve.

12. The method according to claim 1, further comprising:
    constructing a model of the pressure as a function of one or more parameters using a learning phase; and
    determining, from the model, the theoretical value based on at least one start-up value associated with the one or more parameters.

* * * * *